United States Patent [19]

Everett et al.

[11] 4,172,990
[45] Oct. 30, 1979

[54] CONTROL SYSTEM FOR INDUCTIVELY CONTROLLED MULTI-PHASE MOTOR

[75] Inventors: Mickey H. Everett, Leander; J. Steven Flannigan, Houston, both of Tex.

[73] Assignee: Texas Instruments Incorporated, Dallas, Tex.

[21] Appl. No.: 675,037

[22] Filed: Apr. 8, 1976

[51] Int. Cl.² ............................................. G05B 19/40
[52] U.S. Cl. ................................... 318/685; 318/696; 318/138; 318/254
[58] Field of Search .................... 197/1 R, 189, 19, 20, 197/127, 133, 82; 318/696, 685, 138, 254

[56] References Cited

U.S. PATENT DOCUMENTS

| | | | |
|---|---|---|---|
| 3,573,593 | 4/1971 | Beery | 318/696 |
| 3,813,592 | 5/1974 | Ryberg | 318/696 |
| 3,863,118 | 1/1975 | Lander et al. | 318/685 |
| 3,942,619 | 3/1976 | Nordstrom et al. | 197/1 R |

OTHER PUBLICATIONS

"System Architecture for Large Scale Integration," Beelitz et al., AFIPS Conference Proceedings, vol. 31, pp. 185-200, 1968.

*Primary Examiner*—Gene Z. Rubinson
*Assistant Examiner*—Eugene S. Indyk
*Attorney, Agent, or Firm*—Melvin Sharp; Rene' E. Grossman; Thomas G. Devine

[57] ABSTRACT

A control system moves an inductively controlled multi-phase motor in a forward or reverse direction. The motion may be in steps or it may be a continuous rotation. A microprocessor under the control of a ROM operates through an integrated input/out device to provide control signals for the motor.

In the step mode of operation, a high current level is induced in the next motor phase so as to accelerate the motor toward the next detent position. After the motor has traversed a predetermined percentage of the distance to the next detent position, as indicated by a sensor, a high current level is induced in the lagging phase of the motor so as to provide a decelerating torque. After a predetermined time, the high current is switched from the lagging to the leading phase to cause the motor to reach the next detent position, after which the current in the new detent phase is reduced to a holding level.

In the continuous mode of operation, a high level current is caused to switch from phase to phase, thereby causing the motor to rotate in a desired direction. The time between switching instants is preselected to result in a desired rotational velocity. When it is desired to stop the continuous rotation of the motor, the times between switching instants are gradually increased, thereby causing the motor to decelerate to a smooth stop.

14 Claims, 8 Drawing Figures

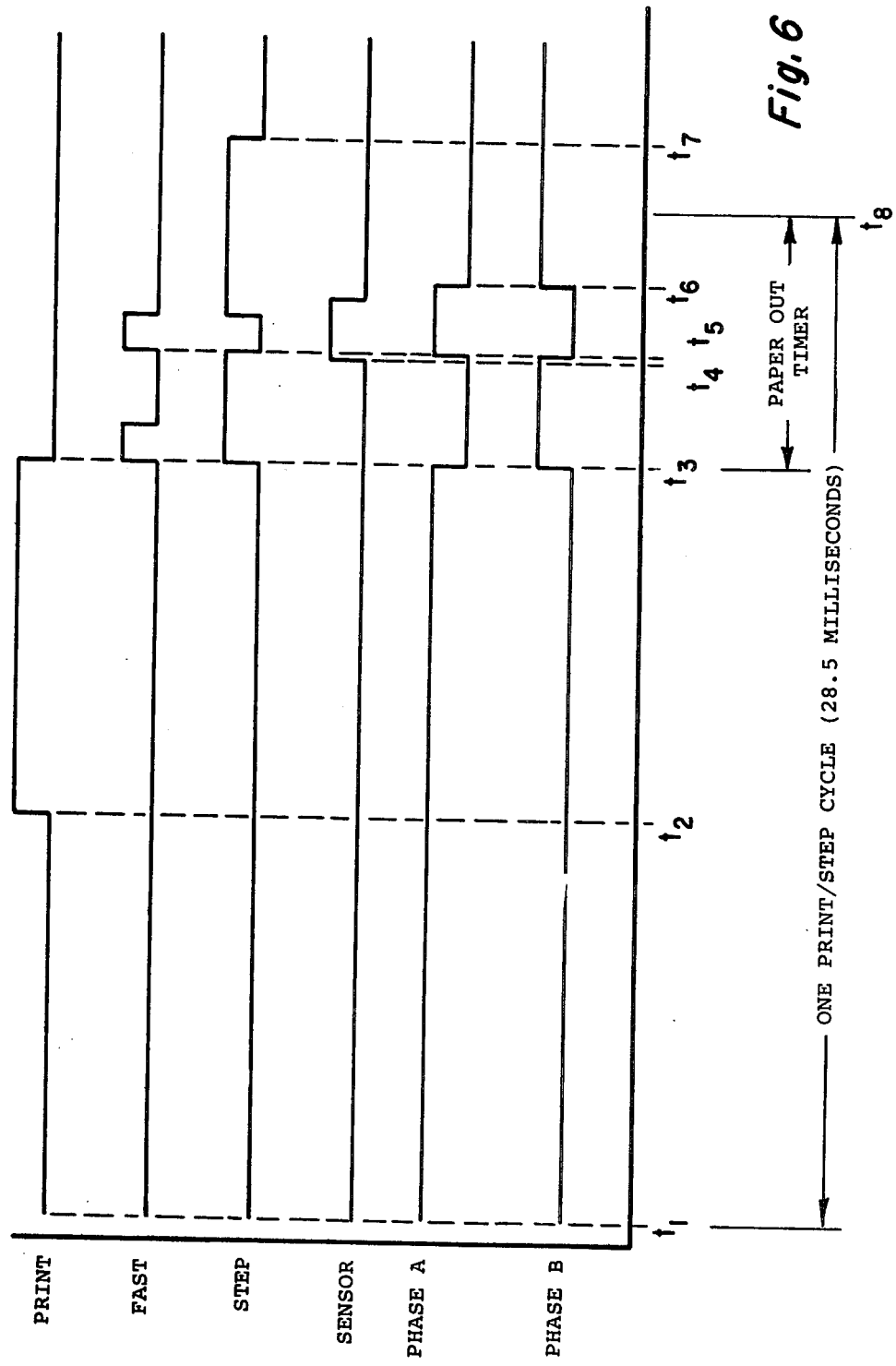

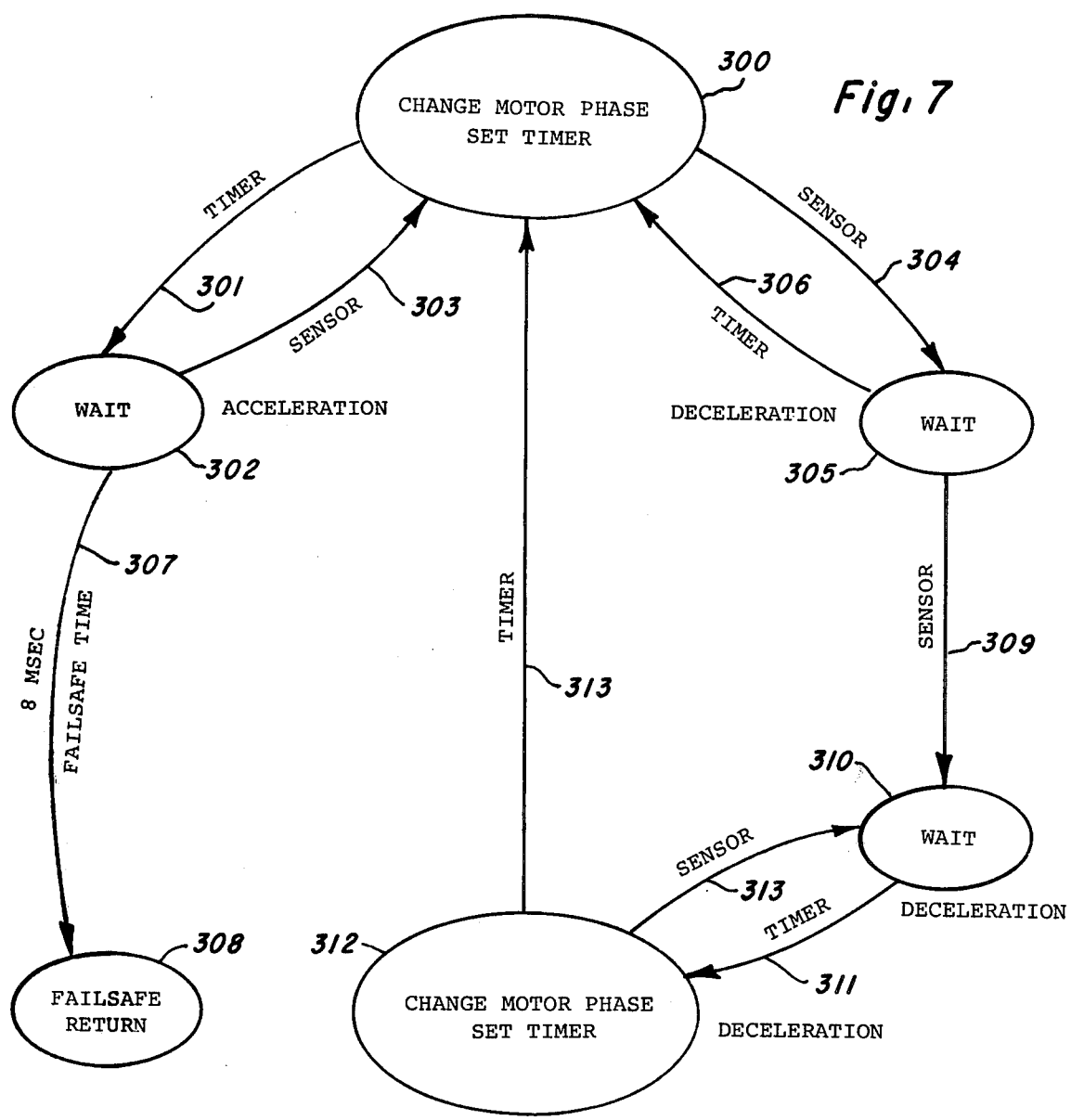

CONTROL SYSTEM FOR INDUCTIVELY CONTROLLED MULTI-PHASE MOTOR

This invention relates generally to the control of an inductively controlled multi-phase motor. More specifically, it relates to the control of a stepper motor whose rotational motion is translated into linear motion.

While the invention is useful in the control of stepper motors for a wide variety of applications, in the preferred embodiment it is used to control a stepper motor for positioning the printhead of a thermal printing mechanism. Printing is accomplished by applying heat to the printhead in a prescribed fashion, the printhead contacting thermally sensitive paper to produce a desired alpha-numeric character. The printing is done when the printhead is moved from left to right. At the end of the printline, the printhead is returned to the left rapidly, in a "carriage return" (SLEW) mode. The printhead can also be moved to the left in a "backspace" mode.

A typical prior art system is that disclosed in U.S. Pat. No. 3,953,778, and entitled "Motion Control System for an Inductively Controlled Multi-Phase Motor". The system disclosed therein is comprised of a plurality of TTL integrated circuits, interconnected to provide the required control functions. One problem with such a combination of elements is the reduction of its size and weight to permit the use of the control system in a small lightweight portable computer terminal. The system disclosed in the above referenced U.S. patent also requires a limit switch to indicate when the printhead is in the left hand limit position. This limit switch further adds to the size and weight requirements of the prior art system. Another disadvantage stemming from the TTL integrated circuit implementations of the prior art system is the relatively large expense involved in modifying the system once it has been built.

It is an object, therefore, of the present invention to provide a small light-weight motion controller for an inductively controlled multi-phase motor.

It is another object of the invention to provide a motion controller using a microprocessor device.

It is a further object of the invention to provide a motion controller which employs a single position sensor.

It is yet another object of the invention to provide a motion controller for a thermal printer having a constant velocity during a substantial portion of the carriage return.

It is still a further object of the invention to provide a motion controller for a thermal printhead wherein the aforementioned single position sensor is utilized to locate the left-hand limit for the printhead travel.

It is another object of the invention to provide a motion controller for a thermal printhead wherein the aforementioned single position sensor is further utilized to detect a paper out condition.

It is a further object of the invention to provide a motion controller wherein the mode of operation of the controller can be modified by changing the contents of a ROM.

Briefly, in the preferred embodiment of the invention, a microprocessor operates under the control of a read-only-memory (ROM) to generate the requisite control signals. A random access memory (RAM) is used to store variables such as various types of pointers, flags, counts, and the microprocessor stack. The microprocessor communicates with various other hardware devices of the printer through an input/output (I/O) integrated circuit which is formed on a single semiconductor chip. The stepper motor drive circuit which provides current to the stepper motor phases is an improved version of the circuit disclosed and claimed in U.S. patent application Ser. No. 452,320, filed Mar. 18, 1974, now abandoned, and entitled "Switching Regulator Control for Inductively Controlled Electro-Mechanical Device".

Operationally, power is selectively applied to the various mesas of the thermal printhead so as to print a character on the thermally sensitive paper, this print operation consuming approximately 10 milliseconds. During the next 18.5 millisecond period, the printhead is stepped to the next position for a subsequent print cycle. To initiate this step from the last detent position to the next detent position, the current in the last phase of the stepper motor is terminated while a high level signal is generated to initiate a rapid build up of current in the next motor phase. This continues until a position sensor located on the stepper motor provides a signal indicating that the motor has traversed as predetermined portion of the angular distance between adjacent detent positions. This sensor signal, after a short delay, is used to turn off the current in the next motor phase, and generate a high level logic signal which controls the values of motor current between one of two levels to cause a rapid build up of current in the lagging motor phase. This build up of current in the lagging motor phase provides a braking torque, and continues for a period of two milliseconds. At the end of this two millisecond period, the current is removed from the lagging phase, and the high level logic signal again induces a build up of current in the leading motor phase. The build up in the leading phase is allowed to continue for four milliseconds so as to pull the motor into the next detent position. At the end of four milliseconds, the logic signal is reduced in amplitude so as to cause the current in the leading motor phase to decay to a level just sufficient to hold the motor in the detent position. If the aforementioned position sensor signal is not received within 7.2 milliseconds after the initiation of the step operation, the controller asserts that a paper out condition has occurred.

Backspace operation functions in a similar manner, but in this case the 10 millisecond print period is eliminated.

During the carriage return operation the logic signal which controls the current in the various motor phases is maintained at a high level. This current is switched consecutively from phase to phase of the stepper motor in an order such as to cause the motor to drive the printhead toward the left-hand limit stop. To initiate the carriage return from a detent position, the current is switched to the adjacent leading motor phase to begin rotation of the motor in the carriage return direction. At the same time, a 1.5 millisecond timer is initiated. This continues until the aforementioned sensor provides a signal to indicate that the motor has rotated through a predetermined fraction of the angle between the start detent position and the adjacent leading detent position. At this point in time, the current is switched to the next leading motor phase and the 1.5 millisecond timer reinitiated. This current switching between motor phases and reinitiation of the 1.5 millisecond timer continues iteratively until the motor reaches an angular velocity such that the signal from the position sensor on some iteration occurs prior to the termination of the 1.5 millisecond timer. From this point on, the current is switched from phase to phase and the timer reinitialized upon the occurrence of the position sensor signal or the expiration of the timer, whichever occurs last. This feedback method of operation insures that, once the acceleration period has ended, the motor will rotate from detent to detent position at a rate of 1.5 milliseconds per step. The constant velocity carriage return continues until a predetermined print column has been reached, column 12 in the preferred embodiment. From column 12 to column 1, at each reinitialization of the timer, an increasing time period is set into the timer, thereby resulting in increasing delays before switching current in the motor phases. The result is a gradual and controlled deceleration of the motor such that its rotational inertia is dissipated when the column 1 position is reached. As a result of the smooth accelerations and decelerations provided by the controller, movement of the printhead is accomplished with a minimum of audible noise.

Other objects and features of the invention will become clear through a consideration of the following detailed description taken in connection with the accompanying drawings wherein:

FIG. 6 is a timing diagram for the print/step sequence.

FIG. 7 is a flow diagram for the carriage return sequence.

Figure 1:
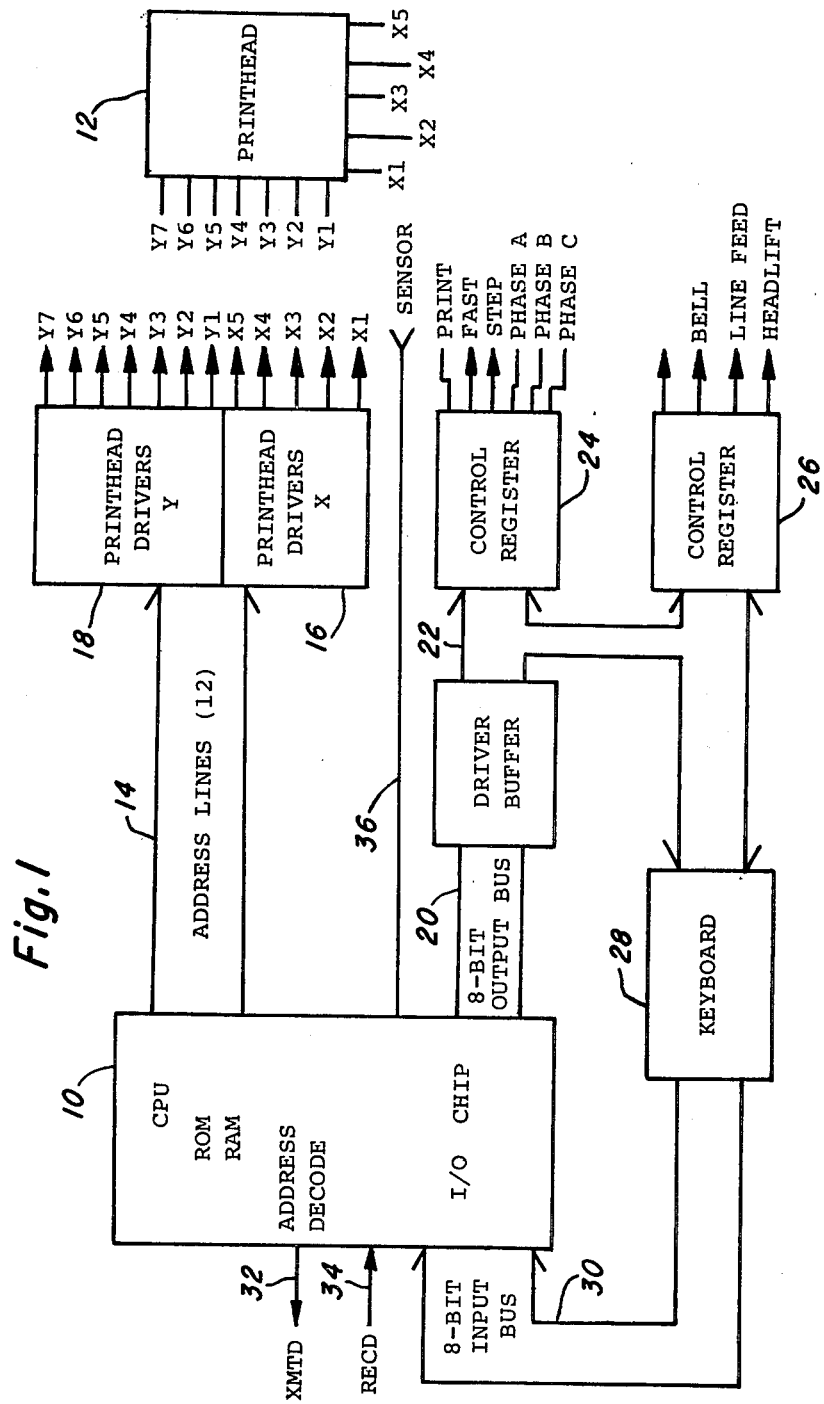
FIG. 1 is a block diagram of a portion of the controller.

There is shown in FIG. 1 a block diagram of a portable thermal printing computer terminal in which the present invention may be used. There is shown at 10, a logic section which in the preferred embodiment comprises first a central processing unit (CPU). The CPU may be a model TMS8080 microprocessor functioning under the control of ROM storage which comprises two Model TMS4700 ROMS, each of which has 1,000 words of eight bit storage. A Model TMS4036 RAM provides 64 words of eight bit storage. Both parallel and serial data input and output services, as well as masked prioritized interrupts and interval timers, are provided by a Model TMS5501 I/O chip. Each of the above referenced TMS devices is available from Texas Instruments Incorporated of Dallas, Texas. Address decode circuits of the type well known in the art respond to the digital addresses provided by the microprocessor to properly address other system elements.

A thermal printhead 12 may be of the type disclosed and claimed in co-pending U.S. patent application Ser. No. 533,427, filed Dec. 16, 1974, and entitled "Thermal Printhead with Memory". This thermal printhead, in the preferred embodiment, comprises a 5×7 element array of electrically and thermally isolated semiconductor mesas. The mesas, when selectively heated, serve to print alpha-numeric or other characters on thermally sensitive paper. For any given character, the 5×7 matrix of mesas is addressed using an x-y coincidence addressing technique. During a relatively brief address period, the columns of mesas are strobed "ON" sequentially by signals appearing on the five column (X) input lines. As each column is strobed, those mesas in the column which are to be heated are turned on by signals appearing on the seven row (Y) input lines. After all five columns have been strobed, the mesas which have been addressed remain on for a print period which is long in comparison with the address period. After the print period, the supply voltage is removed from all mesas, thereby turning them off in preparation for printing of the next character.

The lowest order 12 bits of the 16 bit address bus of the microprocessor are connected by lines 14 to the X and Y printhead drivers 16 and 18. The lowest order 7 bits are coupled to the Y printhead drivers 18 while bits 7 through 11 are coupled to the X printhead drivers 16. During a printing operation, one of bits 7 through 11 will be high to indicate which of the columns of the printhead is to be strobed. At the same time, the bits 0 through 6 will be selectively high to indicate which of the mesas of that column are to be heated. At the same time, a high level bit 13 on the address bus is utilized by the address decode circuit to apply a printhead strobe pulse to printhead drivers 16 and 18, thereby causing the drivers to couple the information on the address bus to the printhead terminals. This procedure is repeated five times so as to sequentially strobe the five columns of the printhead.

Printhead 12 is mounted on a carriage which operates in response to logic signals from the controller to move from one to another of the print positions and to slew to the left in a carriage return mode. The carriage is positioned by a cable which is in turn driven by a three phase stepper motor. The arrangement of the stepper motor, cable, and carriage are of the type well known in the art and need not be further discussed here.

Eight bit data words from the microprocessor are coupled by the I/O chip to parallel output bus 20. The data words are coupled through driver buffer 22, which in the preferred embodiment, simply comprises a Model SN7406 inverter in each of the eight lines of bus 20. The inverters serve to match the signal levels of the I/O chip to the signal levels required by the TTL control registers 24 and 26 and by the keyboard 28. Control registers 24 and 26 may comprise an SN 74174 and SN 74175 integrated circuit, respectively. Selected bits appearing at the output of driver buffer 22 are coupled to the inputs of control registers 24 and 26. During printhead operations, signals from the address decode circuit of logic network 10 strobe these bits onto the output terminals of the control registers 24 and 26 to control printing and motion of the printhead.

Selected output bits from driver buffer 22 are also connected to the row scan lines of keyboard 28. Periodically, keyboard 28 is scanned using these row inputs and detected key depressions are coupled to 8 bit input bus 30. Data appearing on 8 bit input bus 30 in turn is coupled by the I/O to the microprocessor. The interface between keyboard 28 and the control logic is of a type known in the art and need not be further discussed here.

Logic network 10 communicates with external systems such as a remote terminal through the I/O chip on a serial transmit channel 32 and a serial receive channel 34. Serial transmit and receive channels 32 and 34 may be coupled to a telephone line by means of a modem assembly as is well known in the art.

The signal from a position sensor is coupled by line 36 to logic network 10 wherein the I/O chip couples this signal to the CPU.

Figure 2:
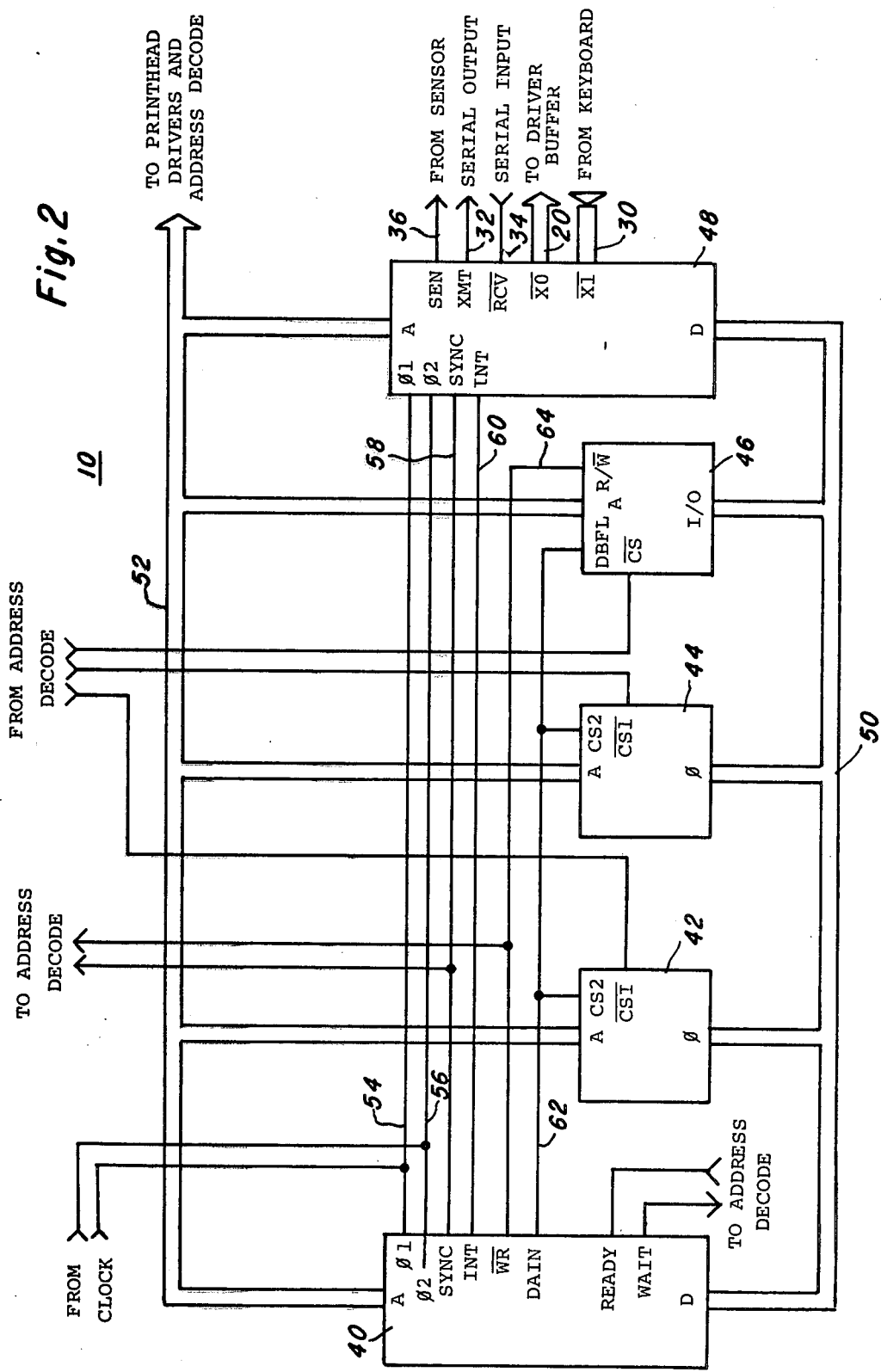
FIG. 2 is a detailed block diagram of the logic section.
Figure 3:
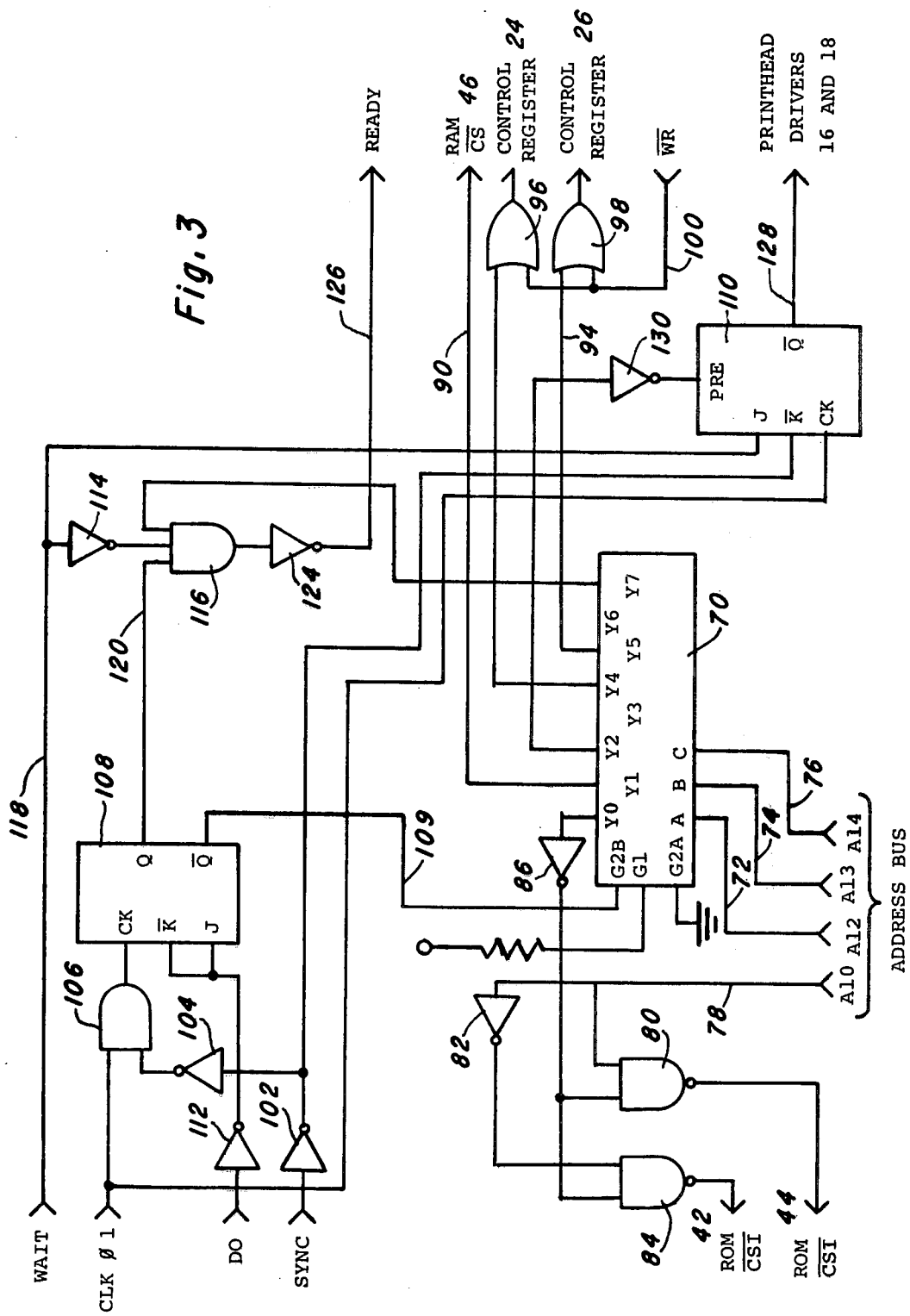
FIG. 3 is a schematic diagram of the address decode circuit.

Logic network 10 is shown in greater detail in FIGS. 2 and 3, the latter figure disclosing the details of the address decode circuits. With reference to FIG. 2, CPU 40 comprises a microprocessor, which as previously noted in the preferred embodiment is a Model TMS8080 device. CPU 40 operates under control of ROMs 42 and 44. In addition to the instruction sequence for the CPU, ROMs 42 and 44 contain tables such as a table of delay times for switching phases on the stepper motor as the printhead carriage travels from column 12 to column 1 in the carriage return mode. Temporary storage for CPU 40 is provided by RAM 46. Finally, input/output services for the CPU are provided by I/O chip 48.

CPU 40 has an 8 bit data word which is coupled to each of ROMs 42 and 44, RAM 46, and I/O chip 48 by 8 bit data bus 50. CPU 40 has a 16 bit address word which is coupled by address bus 52 to the various elements of logic network 10. Bits A0 through A9 of the address word are coupled to the 10 address inputs of each of ROMs 42 and 44. Bits A0 through A5 of the address word are coupled to the six address inputs of RAM 46. Bits A0 through A3 of the address word are coupled to the four address inputs of I/O chip 48. Finally, bit A15 of the address word is coupled to the chip enable input of I/O chip 48.

The clock inputs of CPU 40 and I/O chip 48 are provided on lines 54 and 56 from a two phase clock. The clock has period of 500 nanoseconds. The sync output of CPU 40 is coupled by line 58 to the sync input of I/O chip 48. Interrupt signals from I/O chip 48 are coupled by line 60 to the interrupt input of CPU 40. The CPU DBIN signal is coupled by line 62 to the CS2 inputs of ROMs 42 and 44 to the DBFL input of RAM 46. Line 64 couples the $\overline{WR}$ output of CPU 40 to the R/W input of RAM 46. Various signals appearing in FIG. 2 are coupled to the address decode circuit of FIG. 3, these including the SYNC, $\overline{WR}$, and WAIT outputs of CPU 40, as well as bits A10, A12, A13 and A14 of the address bus. Signals from the address decode circuit are coupled to the $\overline{CS1}$ terminals of ROMs 42 and 44 and to the $\overline{CS}$ terminal of RAM 46.

The position sensor signal is coupled by line 36 to the SEN terminal of I/O chip 48. The serial output and input channels 32 and 34 connect to the XMT and $\overline{RCV}$ terminals, respectively, of the I/O chip. The 8 bit parallel output word $\overline{X0}$ is connected by output bus 20 to the driver buffer 22. Data from the keyboard is coupled by 8 bit input bus 30 to the 8 XI terminals of I/O chip 48.

The address decode circuits as illustrated in FIG. 3 respond to bits A10, A12, A13 and A14 of the address bus to selectively energize various elements of the control system. Decoder 70 in the preferred embodiment is a Model 74LS138 TTL integrated circuit. Address bits A12, A13, and A14 are coupled respectively to the A, B and C inputs of decoder 70 by lines 72, 74 and 76. When the G1 and G2A inputs of decoder 70 are connected as shown and when the G2B input is in the low logic state, all but one of the Y output terminals will have a high logic level, the single Y output terminal in the low state being determined by the state of A, B and C inputs as shown in Table I. The A10 bit of the address bus is coupled by line 78 to one input of NAND gate 80 and through inverter 82 to one input of NAND gate 84. The Y0 output of decoder 70 is coupled through inverter 86 to the other input of each of NAND gates 80 and 84. If the A, B and C inputs of decoder 70 and 000, the resulting low level of the Y0 output will cause one of NAND gates 80 and 84 to have a low level output. If, for example, the A10 bit of the address bus is low, the output of NAND gate 84 will be low thereby enabling ROM 42. Alternatively, if the A10 bit is high ROM 44 will be enabled by NAND gate 80. When the A, B, and C inputs of decoder are 001, the resulting low level Y1 output signal enables RAM 46 through line 90. Lines 92 and 94 couple the the Y4 and Y5 outputs to one input of each of OR gates 96 and 98. When the decoder 70 input is 100, the resulting Y4 output low logic level causes a low logic level at the output of OR gate 96. This is coupled to the clock input of control register 24 which simply comprises a plurality of D flip flops, one in each line of the control register. The low level clock input to the control register transfers the information from the D inputs of the flip flops to their outputs so as to provide appropriate PRINT, FAST, STEP, and phase control signals to the carriage drive electronics. Similarly, a 101 input to decoder 70 results in a low level Y5 output and ultimately in a low level at the output of OR gate 98. This low level signal clocks the D flip flops of control register 26 so as to provide appropriate bell, linefeed, and headlift signals. Clocking of control registers 24 and 26 is inhibited, however, when the CPU write signal $\overline{WR}$ appearing on line 100 is in the high logic level.

TABLE I

| Logic Levels Input to Decoder | | | All Y Output Terminals are at a High Logic Level Except: |
|---|---|---|---|
| A | B | C | |
| 0 | 0 | 0 | Y0 |
| 0 | 0 | 1 | Y1 |
| 0 | 1 | 0 | Y2 |
| 0 | 1 | 1 | Y3 |
| 1 | 0 | 0 | Y4 |
| 1 | 0 | 1 | Y5 |
| 1 | 1 | 0 | Y6 |

The SYNC output of CPU 40 is coupled by inverters 102 and 104 to one input of AND gate 106. The high level SYNC signal which occurs at the beginning of each machine cycle of the CPU, gates one pulse from clock phase one through AND gate 106 to the clock input of JK flip flop 108. Each of JK flip flops 108 and 110 may be a Model 74109 integrated circuit. While the SYNC signal is high at the beginning of each machine cycle, the 8 bit data output bus of CPU 40 contains status bits from the CPU. The D0 status bit, which is coupled through inverter 112 to the J and K inputs of flip flop 108, is high if the machine cycle is an interrupt acknowledge and is low for all other types of machine cycles. Flip flop 108, when connected as shown in FIG. 3, operates as a D flip flop. Accordingly, if the machine cycle is not an interrupt acknowledge, the Q output of flip flop 108 is clocked to a high level, this signal being coupled by line 120 to one input of AND gate 116. During this portion of the machine cycle, the WAIT output of CPU 40 appearing on line 118 is low. This low level is inverted by inverter 114 to present a high level to a second input of AND gate 116. If the machine cycle is not one in which the CPU communicates with I/O chip 48, the Y7 output of encoder 70 which is coupled by line 122 to a third input of AND gate 116 will also be high.

The resultant high level at the output of AND gate 116 is inverted by inverter 124 to a low level READY signal appearing on line 126. This low level READY signal is tested by CPU 40 during the second state of the machine cycle, and the low level READY signal causes the WAIT output of CPU 40 to go high at the end of the second state. This high level WAIT signal, after inversion by inverter 114, causes the output of AND gate 116 to go low, thereby resulting in a high level READY signal. The high level READY signal permits the CPU to read from or write on the data bus during the third state of the machine cycle.

If, in contrast with the foregoing, the machine cycle is an interrupt acknowledge, the D0 line of the data bus will be high during the SYNC pulse that initiates the machine cycle. This high level D0 is inverted by inverter 112 and clocked to the Q output of flip flop 108 by a clock pulse. The low level Q output causes the output of AND gate 116 to be low so that the READY signal is high when tested during the second state of the machine cycle. As a result, CPU 40 can pass directly to the third state of the machine cycle without encountering a WAIT state. It should also be noted that under these conditions, the high level $\overline{Q}$ output of flip flop 108, coupled by line 109 to the G2B input of decoder 70, inhibits the decoder from "reading" the address bits during an interrupt acknowledge.

The WAIT state is also skipped when the Y7 output of decoder 70 is low during the second state of a machine cycle.

The $\overline{Q}$ output of flip flop 110 appears on line 128 and is used to strobe printhead drivers 16 and 18. The Y2 output of decoder 70 (normally at a high logic level) is inverted by inverter 130 and the resultant low level logic signal presets the $\overline{Q}$ output of flip flop 110 to a low logic level. This preset is released only when the Y2 output of decoder 70 goes low, that is when the decoder input is 010. With the Y2 output low, the $\overline{Q}$ output of flip flop 110 is controlled by its J and $\overline{K}$ inputs. The high level SYNC pulse which initiates a machine cycle to strobe the printhead, is inverted by inverter 102 to provide a low level $\overline{K}$ input to flip flop 110. At the same time, the WAIT signal appearing on line 118 is low during this portion of the machine cycle so that the flip flop also has a low level J input. Under these conditions, the clock pulse from clock phase 1 switches the $\overline{Q}$ output of flip flop 110 to a high state. When the next clock pulse occurs, the WAIT signal appearing on line 118 will still be low but the inverted SYNC signal appearing at the $\overline{K}$ input of flip flop 110 will be high. Under these conditions, the clock signal will cause the $\overline{Q}$ output to remain in the state that it occupied just prior to the clock pulse, that is, the high state. At the time of the next succeeding clock pulse, the WAIT signal will have gone high so that both inpupts to flip flop 110 are high with the result that the clock pulse switches the $\overline{Q}$ output back to the low state. It will be seen, therefore, that a print strobe machine cycle will cause the $\overline{Q}$ output appearing on line 128 to go high for a time period equal to the duration of two clock cycles. In the preferred embodiment where the clock pulses have a period of 500 nanoseconds, the printhead driver signals on line 128 remain high for one microsecond. The printhead drivers comprise a set of 12 AND gates, one in each of the 5 X and 7 Y printhead drive lines. The printhead drive signal appearing on line 128 is coupled to one input of each of these AND gates. Accordingly, a high level printhead drive signal gates the corresponding X and Y signals through the printhead drivers to the printhead itself.

Figure 4:
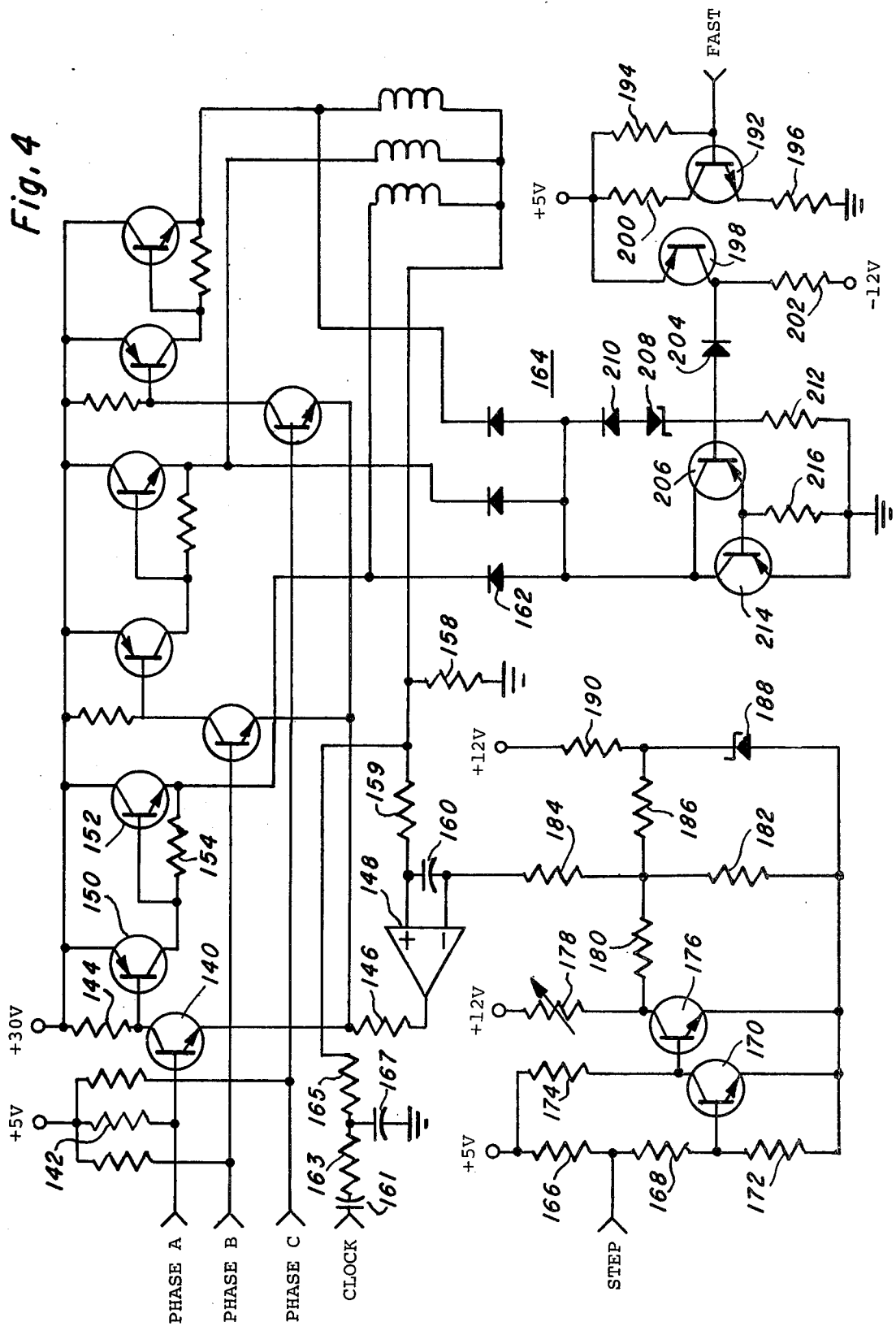
FIG. 4 is a schematic diagram of the motor driver circuit.

In FIG. 4 is shown a schematic diagram of the stepper motor drive circuit which, subject to certain important exceptions, is similar to that disclosed in the aforementioned U.S. patent application Ser. No. 452,320. With reference to FIG. 4, the PHASE A signal from control register 24 is coupled to the base of transistor 140 and through resistor 142 to a +5 volt supply. Transistor 140 has its collector referenced through resistor 144 to a +30 volt supply and its emitter through resistor 146 to the output of comparator amplifier 148. The collector of transistor 140 to connected to the base of transistor 150, whose emitter is connected to the +30 volt supply. The collector of transistor 150 is connected to the base of transistor 152 and through resistor 154 to the emitter of transistor 152. The collector of transistor 152 is coupled to the +30 volt supply while its emitter is further coupled to the PHASE A winding 156 of the stepper motor. The opposite end of the PHASE A winding is coupled through current sensing resistor 158 to ground. The ungrounded side of current sensing 158 is connected through resistor 159 to capacitor 160 and to the noninverting input of comparator amplifier 148. The junction between the emitter of transistor 152 and stepper motor coil 156 is also connected to the cathode of "catch" diode 162. The anode of catch diode 162 is connected to a network indicated generally by reference designator 164. Network 164 replaces the recovery resistor normally found at this point in similar circuits.

As seen in FIG. 4, the current drive circuits for the PHASE B and C coils of the stepper motor are identical to that just described for PHASE A and no further discussion of these circuits is required here.

The step signal from control register 24 is connected to resistors 166 and 168, the former being coupled at its other end to the +5 volt supply voltage and the latter being coupled at its other end to the base of transitor 170. The base of transitor 170 is also connected through resistor 172 to ground and the emitter of transistor 170 is grounded. The collector of transitor 170 is connected through resistor 174 to the +5 volt supply and also to the base of transistor 176. Transistor 176 has its emitter grounded while its collector is referenced through variable resistor 178 to a +12 volt supply. The collector of transistor 176 is also connected through resistor 180 to one end of resistor 182, the other end of this resistor being grounded. The junction between resistors 180 and 182 is also connected through resistor 184 to the inverting input of comparator amplifier 148 and to one end of capacitor 160. Finally, the junction between resistors 180, 182 and 184 is also coupled through resistor 186 to the cathode of zener diode 188, the anode of this diode being grounded. The cathode of diode 188 is also connected through resistor 190 to the +12 volt supply.

A clock input is coupled through capacitor 161, resistor 163, and resistor 165 to the junction between resistors 158 and 159. The junction between resistors 163 and 165 is also coupled through capacitor 167 to ground. The clock input which has a frequency of 20.8 KHZ synchronizes the switching action of the regulator and is chosen to be outside the audible frequency range of human beings.

The circuit of FIG. 4, in response to phase control signals at the PHASE A, B and C input terminals, serves to selectively energize one of the windings of the stepper motor. Further, in response to the CLOCK, STEP and FAST inputs, the circuit functions in a switching regulator mode to control the average current flowing in the selected motor winding. The current in the selected winding flows through current sensing resistor 158 to ground and generates a voltage across that resistor proportional to the current flowing in the selected winding. This voltage is mixed with the clock input signal and the combined signal is coupled to the noninverting terminal of comparator 148. A voltage reference controlled by the "STEP" signal is coupled to the inverting terminal of comparator 148. Subject to the replacement of the recovery resistor by the network 164, the circuit functions substantially in the manner disclosed in the aforementioned U.S. patent application, Ser. No. 452,320, to provide closed loop control of the current flowing in the selected motor winding. In the preferred embodiment, variable resistor 178 is adjusted so that the average current flowing in the selected winding when the STEP signal is in the high state is approximately 1.4 amps, while the average current when the STEP signal is in the low state is approximately 0.6 amps.

Turning next to network 164, the FAST input signal from control register 24 is connected to the base of transistor 192 and through resistor 194 to the +5 volt supply. The emitter of transistor 192 is referenced through resistor 196 to ground while its collector is connected to the base of transistor 198 and through resistor 200 to the +5 volt supply. The emitter of transistor 198 is also connected to the +5 volt supply while the collector of that transistor is connected through resistor 202 to a −12 volt supply. Diode 204 couples the collector of transistor 198 to the base of transistor 206. The anode of diode 204 is also connected through zener diode 208 and diode 210 to the anode of the catch diode (i.e., diode 162). The anode of diode 204 is also coupled through resistor 212 to ground. The emitter of transistor 206 is coupled to the base of transistor 214 and through resistor 216 to ground. Transistor 214 has its emitter connected to ground, while its collector, in common with the collector of transistor 206, is connected to the anodes of the catch diodes.

Considering now the operation of the network, when the FAST input signal is in the low logic state, transistors 192 and 198 are turned off. This permits the −12 volt supply operating through resistor 202 and diode 204 to turn on transistors 206 and 214 hard. When a stepper motor winding such as winding 156 is conducting current and the current drive is suddenly interrupted as by turning off transistor 152, the inductance of winding 156 tends to maintain the flow of current. The path for this current flow from winding 156 is through resistor 158 to ground and back through transistor 214 and catch diode 162 to the winding. With the FAST input signal in the low logic state, transitor 214 which is turned on hard places very little load across the winding and the inductively maintained current decays at a relatively slow rate as desired during normal switching regulator action.

Whence the FAST input signal is in a high logic state, transistors 192 and 198 are turned on so as to prevent the −12 volt supply from turning on transistors 206 and 214. When the current drive to a winding such as winding 156 is interrupted, however, the rapidly decaying current causes a large reverse voltage to appear across the winding. Since very little of this voltage is dropped across resistor 158 which in the preferred embodiment has a resistance of one/half ohm, almost this total inductive voltage appears across the series combination of the emitter-to-base junctions of transistors 214 and 206, and diodes 208, 210 and 162. This inductive voltage rapidly reaches a level greater than the 20 volt breakdown voltage of zener diode 208. At this point, transistors 206 and 214 turn on and the voltage appearing across winding 156 (neglecting the very small voltage drop across resistor 158) is maintained at a level equal to the sum of the emitter-to-base voltage drops of transistors 206 and 214, the breakdown voltage of zener diode 208, and the forward diode drop of diodes 210 and 162. This voltage drop which will be labeled $V_r$ has a value of approximately 23 volts. Thus, with the FAST input signal in a high logic state, the path for the decaying inductive current may be thought of simply as a resistive load appearing across the motor winding. The effective value of this resistive load at the beginning of the decay period is simply $V_r$ divided by the initial current flowing in the motor winding. In the preferred embodiment where $V_r$ has a value of 23 volts, and the initial current flowing in the motor winding is 1.4 amperes (assuming a high level STEP signal) this effective resistance initially has a value of approximately 16 ohms. As the current decay proceeds, however, the voltage across winding 156 is maintained constant at $V_r$ volts while the current decays. It will be seen, therefore, that the effective value of the resistive load appearing across the motor winding increases as the current decays so as to maintain the current decay at a constant rate.

This may be seen more readily by considering that the voltage appearing across the motor winding is L di/dt. Since the inductance remains relatively constant, and since network 164 maintains a constant voltage across the winding, it follows that di/dt is a constant. In prior art systems which use a recovery resistor in series with the catch diodes, the current decay was exponential with an L/R time constant. In the present system, the current decays lineraly and rapidly to 0. This has several important advantages.

First, as the stepper motor is stepped from one phase to the next phase, the FAST signal is simultaneously switched to a high logic state. This has the result of rapidly killing the current in the lagging motor phase so as to facilitate acceleration of the motor toward the next detent position. Another advantage of network 164 may be appreciated by considering that in prior art systems the recovery resistor is in the decaying current path at all times. This resistor must have a relatively high value so as to result in a rapid L/R current decay when the motor current is switched from a lagging to a leading phase. This large resistance, however, is also in the decay path when the motor is in a detent position and the switching regulator action of the controller causes the current drive to be alternately connected to and disconnected from the detent motor winding. During each disconnect portion of the cycle the motor current flows through the large value of resistance resulting in substantial power loss. With the network 164, however, during detent modes, the FAST input signal can be switched low with the result that the effective resistance appearing in the decaying current path is very low. Accordingly, there is almost no power lost in the decaying current path when the motor is in detent.

Figure 5A:
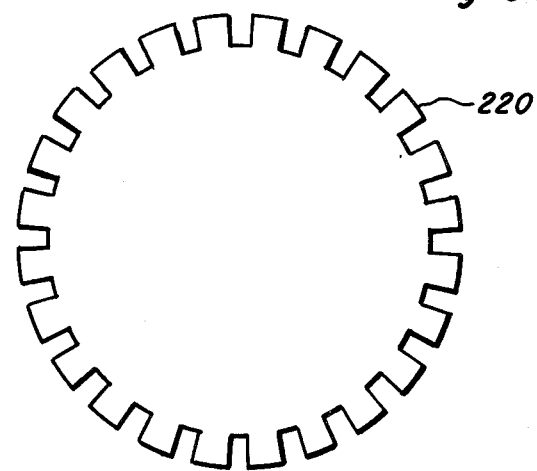
FIG. 5a shows the position sensor.
Figure 5B:
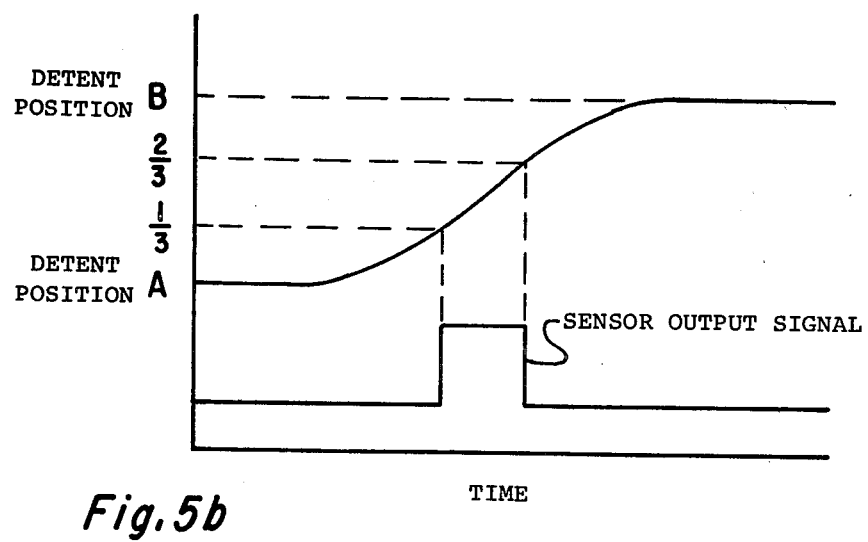
FIG. 5b shows the output of the position sensor.

The determination of the position of the printhead at all times is accomplished with the aid of an optical sensing system associated with the stepper motor. A slotted disc 220 as illustrated in FIG. 5a is rigidly affixed to the shaft of the stepper motor so as to rotate with the stepper motor. A light source and sensor are located on opposite sides of slotted disc 220. The light source and sensor are oriented relative to slotted disc 220 such that the disc blocks the light path at all times except when one of the slots is in registry with the light path. The stepper motor used in the preferred embodiment of the invention has adjacent detent positions separated by 15° of arc. Slotted disc 220 has a slot corresponding to each detent position. The disc is mounted on the shaft of the stepper motor such that, when the motor is in a detent position, the light path will strike the disc at a point midway between two adjacent slots. As the stepper motor is stepped from one detent position to the next, the electrical output of the light sensor changes states during that portion of the step when one of the slots traverses the light path. The angular position of the stepper motor as it steps from one detent position to the next and the corresponding electrical output signal from the light sensor are illustrated in FIG. 5b. Each of the slots in slotted disc 220 is 5° wide and as pointed out above is located midway between two adjacent detent positions of the stepper motor. Accordingly, when the stepper motor has moved ⅓ of the way from one detent position to the next, the light beam enters the slotted area of the wheel and a quantum increase in the sensor output signal is noted. This continues until the stepper motor has reached two thirds of the travel to the next detent position, at which time slotted wheel 220 again blocks the light beam and the sensor output signal returns to its low logic level. This sensor output signal is coupled to line 36 of FIGS. 1 and 2. While the preferred embodiment employs 5° slots located midway between adjacent detent positions, variations in the slot width and location may be made without departing from the spirit and scope of the invention.

As previously noted, microprocessor 40 operates under the control of ROMs 42 and 44. Table II gives the contents of ROM 42, while Table III gives the contents of ROM 44. The left hand column of each table gives the address of the first of 16 bytes in each row. These addresses, as well as the data at each byte location, are given in hexadecimal format. Each byte represents 8 bits of binary information.

The operation of the printhead control may be divided into a print step sequence and a carriage return sequence. Considering the print/step operation, the controller first acquires the dot pattern for the particular character to be printed from ROM storage. This dot pattern is then strobed into the printhead and the print operation performed. At the completion of the print operation, the controller steps the printhead carriage to the next printer position in preparation for printing the next character.

TABLE II

| | | | | | | | | | | | | | | | | |
|---|---|---|---|---|---|---|---|---|---|---|---|---|---|---|---|---|
| 0000 | 3E | 09 | 32 | 04 | F0 | C3 | 39 | 00 | F5 | E5 | CD | 3B | 04 | C3 | 34 | 03 |
| 0010 | F5 | E5 | C5 | C3 | 3C | 03 | 76 | 76 | F5 | E5 | C5 | C3 | 30 | 03 | CF | 77 |
| 0020 | 3E | 0E | 32 | 08 | F0 | C3 | D1 | 02 | 3A | 00 | 60 | 3C | C8 | C3 | 00 | 60 |
| 0030 | 3E | 0E | 32 | 08 | F0 | C3 | DE | 00 | C7 | AF | 32 | 00 | 10 | 31 | 40 | 10 |
| 0040 | 06 | 3F | 21 | 01 | 10 | AF | 77 | 23 | 05 | C2 | 46 | 00 | 2F | 32 | 0B | 10 |
| 0050 | 21 | 20 | 10 | 22 | 17 | 10 | 36 | 20 | 2B | 36 | 20 | 2B | 36 | 08 | 2B | 36 |
| 0060 | 08 | 2B | 22 | 15 | 10 | 3E | 41 | 32 | 01 | 10 | 21 | 37 | 03 | 22 | 09 | 10 |
| 0070 | 3E | 04 | 32 | 08 | 10 | 3E | 58 | 32 | 04 | 10 | 06 | 04 | EF | CD | 94 | 04 |
| 0080 | F7 | 76 | C3 | 81 | 00 | 06 | 03 | EF | 7A | E6 | 08 | CA | 90 | 01 | 3E | 0A |
| 0090 | 32 | 04 | F0 | C3 | 90 | 01 | BE | 3E | 02 | CA | 9E | 00 | 3E | 13 | 32 | 14 |
| 00A0 | 10 | 0E | 0D | AF | 32 | 00 | 10 | 3A | 08 | 10 | B7 | C2 | B0 | 00 | 0E | 0A |
| 00B0 | 21 | 01 | 10 | F3 | 7E | F6 | 80 | 77 | FB | 21 | AC | 05 | C3 | 9E | 01 | 7A |
| 00C0 | 07 | D2 | 27 | 01 | 7B | 3D | CA | 27 | 01 | 3E | 02 | 32 | 14 | 10 | 3A | 0C |
| 00D0 | 10 | C3 | 9A | 01 | 7E | FE | 36 | C0 | 3E | 08 | 32 | 04 | F0 | C9 | FB | CD |
| 00E0 | EA | 00 | F3 | 3E | 5E | 32 | 08 | F0 | FB | C9 | CD | 13 | 01 | E6 | 3F | 57 |
| 00F0 | 21 | 14 | 10 | 35 | F2 | 40 | 01 | 3A | 03 | F0 | E6 | 10 | CA | 27 | 01 | 97 |
| 0100 | 77 | 4F | 6F | 3C | CD | 15 | 01 | 5F | 0F | E6 | 80 | B2 | 57 | 7B | E6 | FE |
| 0110 | C3 | 4B | 01 | 3E | 80 | 47 | F3 | 32 | 07 | F0 | 3A | 01 | F0 | FB | 2F | C9 |
| 0120 | CD | D4 | 00 | 07 | D2 | 2F | 01 | 21 | 36 | 02 | 0E | FF | C3 | A2 | 01 | F2 |
| 0130 | 3E | 01 | FE | 02 | CA | 3E | 01 | 7A | 07 | 1E | 00 | DA | C9 | 00 | 36 | FF |
| 0140 | 21 | AC | 05 | 0E | FF | C3 | A2 | 01 | CD | 15 | 01 | B7 | CA | 61 | 01 | 1F |
| 0150 | DA | 57 | 01 | 2C | C3 | 4F | 01 | B7 | C2 | 27 | 01 | B9 | FA | 27 | 01 | 0C |
| 0160 | 5D | 7D | C6 | 08 | 6F | 78 | 07 | FE | 80 | C2 | 48 | 01 | 21 | 0B | 10 | 0D |
| 0170 | C2 | 20 | 01 | 7B | FE | 36 | CA | 85 | 00 | CD | D4 | 00 | 7B | FE | 37 | CA |
| 0180 | 96 | 00 | BE | CA | BF | 00 | 3D | C2 | 94 | 01 | 06 | 01 | EF | CD | 01 | 03 |
| 0190 | 73 | C3 | 40 | 01 | 06 | 08 | EF | CD | F8 | 05 | 21 | AC | 05 | 4F | 7B | 32 |
| 01A0 | 0B | 10 | 7D | 32 | 0C | F0 | F3 | 3A | 0F | 10 | 94 | 32 | 0F | 10 | F2 | B6 |
| 01B0 | 01 | 06 | FB | CD | 28 | 03 | FB | 3A | 0B | 10 | FE | 37 | 7A | C2 | C2 | 01 |
| 01C0 | E6 | F7 | E6 | 08 | 5F | 21 | 01 | 10 | F3 | 7E | E6 | F7 | B3 | 77 | FB | 5F |
| 01D0 | 7A | E6 | 20 | 2E | 84 | CA | DA | 01 | 2E | 01 | 06 | 02 | EF | 7D | 32 | 05 |
| 01E0 | F0 | 3A | 03 | F0 | E6 | 10 | C8 | 7B | B7 | FA | 12 | 02 | 21 | 06 | 10 | 7E |
| 01F0 | 0F | D2 | FA | 01 | 35 | 0E | 0A | C3 | 12 | 02 | 79 | FE | 0D | 02 | 12 | 02 |
| 0200 | 7A | E6 | 0E | FE | 06 | 02 | 0C | 02 | 7E | EE | 80 | 77 | 7E | 07 | D2 | 12 |
| 0210 | 02 | 34 | 21 | 13 | 10 | 7B | E6 | 08 | D2 | 1F | 02 | 77 | C3 | 61 | 02 | 7E |
| 0220 | B7 | CA | 40 | 02 | 06 | 00 | 3A | 04 | 60 | 3C | CA | 37 | 02 | 3D | 1F | DA |
| 0230 | 33 | 02 | BE | D2 | 39 | 02 | 70 | 09 | 34 | 4E | 21 | 03 | 60 | 09 | 4E |
| 0240 | 79 | B7 | F8 | CD | 13 | 01 | 17 | DA | 52 | 02 | 47 | 79 | B7 | 78 | EA | 52 |
| 0250 | 02 | 2F | E6 | 80 | B1 | 67 | 06 | 10 | EF | 7C | 32 | 06 | F0 | 7H | E6 | 10 |
| 0260 | C8 | 79 | B7 | F8 | C8 | FE | 7F | D8 | F3 | 21 | 01 | 10 | 7E | 0F | D2 | 88 |
| 0270 | 02 | 2A | 15 | 10 | AF | BE | C0 | 71 | CD | 7F | 02 | 22 | 15 | 10 | C9 | 2B |
| 0280 | 7D | FE | 18 | C0 | 21 | 20 | 10 | C9 | 79 | FE | 07 | CA | 11 | 03 | 34 | FE |
| 0290 | 0A | CA | 94 | 04 | FE | 0D | CA | CC | 04 | 3A | 08 | 10 | B7 | CA | AB | 02 |
| 02A0 | 79 | FE | 20 | F2 | 46 | 03 | FE | 08 | CA | 51 | 03 | 21 | 01 | 10 | 7E | E6 |
| 02B0 | 90 | 77 | 2H | 17 | 10 | 7E | 4F | B7 | C8 | FE | 20 | FA | 06 | 02 | 3A | 04 |
| 02C0 | 10 | FE | 51 | CA | 05 | 04 | 36 | 00 | CD | 7F | 02 | 22 | 17 | 10 | C3 | 61 |
| 02D0 | 02 | FB | 3A | 00 | F0 | E6 | 7F | 4F | 06 | 00 | EF | 3E | 05 | B9 | CC | 01 |
| 02E0 | 03 | 3A | 00 | 10 | FE | 05 | D2 | E2 | 00 | 2A | 15 | 10 | CD | 7F | 02 | 3A |
| 02F0 | 17 | 10 | BD | CA | E2 | 00 | 3A | 01 | 10 | E6 | 08 | C4 | 61 | 02 | C3 | E2 |
| 0300 | 00 | 3A | 01 | 10 | E6 | 08 | C8 | 3A | 13 | 10 | B7 | C0 | 3C | 32 | 13 | 10 |
| 0310 | C9 | 3E | 70 | 32 | 0F | 10 | 06 | 04 | CD | 1E | 03 | C3 | AB | 02 | 21 | 0D |
| 0320 | 10 | 7E | B0 | 32 | 07 | D0 | 77 | C9 | 21 | 0D | 10 | 7E | A0 | C3 | 23 | 03 |

TABLE II-continued

| | | | | | | | | | | | | | | | |
|---|---|---|---|---|---|---|---|---|---|---|---|---|---|---|---|
| 0330 | CD | 38 | 03 | D1 | E1 | F1 | FB | C9 | 2A | 02 | 10 | E9 | CD | 42 | 03 | C3 |
| 0340 | 33 | 03 | 2A | 09 | 10 | E9 | 21 | 04 | 10 | 7E | FE | 51 | CA | 02 | 04 | 34 |
| 0350 | 79 | 32 | 0E | 10 | 21 | 60 | 03 | 3E | A8 | 32 | 0B | F0 | 22 | 02 | 10 | C9 |
| 0360 | 3A | 0E | 10 | FE | 20 | DA | B9 | 03 | CA | B1 | 03 | D5 | 11 | 07 | 06 | 21 |
| 0370 | 85 | 03 | 4F | 06 | 06 | EF | 79 | FE | 61 | DA | 85 | 03 | D6 | 20 | FE | 5B |
| 0380 | DA | 85 | 03 | 06 | 06 | 4F | 69 | AF | 67 | 47 | 29 | 29 | 09 | 19 | 3A | 08 |
| 0390 | 10 | F6 | 40 | 32 | 07 | C0 | 3E | 80 | 16 | 20 | B6 | 23 | 5F | 12 | EB | 29 |
| 03A0 | EB | 7A | E6 | 1F | FE | 10 | CA | B0 | 03 | F6 | 20 | 57 | AF | C3 | 9A | 03 |
| 03B0 | D1 | 21 | C3 | 03 | 3E | 96 | C3 | 59 | 03 | CD | 82 | 04 | 0D | FA | AB | 02 |
| 03C0 | C3 | CC | 03 | 3A | 08 | 10 | 0F | D2 | CC | 03 | CE | 04 | 32 | 07 | 10 | F6 |
| 03D0 | 18 | 21 | 72 | 04 | 22 | 10 | 10 | 21 | 0A | FA | 36 | 10 | 21 | E7 | 03 | 32 |
| 03E0 | 07 | C0 | 3E | 6F | C3 | 59 | 03 | 2A | 10 | 10 | 7E | E6 | 40 | CA | 11 | 04 |
| 03F0 | 3A | 07 | 10 | 32 | 07 | C0 | 32 | 08 | 10 | 21 | 37 | 03 | 22 | 09 | 10 | 21 |

TABLE III

| | | | | | | | | | | | | | | | |
|---|---|---|---|---|---|---|---|---|---|---|---|---|---|---|---|
| 0400 | 04 | 10 | 3A | D1 | 10 | E6 | 40 | CA | 20 | 04 | 21 | 00 | 10 | 34 | 32 | 08 |
| 0410 | 10 | 21 | 01 | 10 | 7E | 07 | DA | 94 | 04 | B7 | FA | 54 | 03 | C3 | AB | 02 |
| 0420 | 7E | FE | 55 | D2 | 11 | 04 | 36 | 01 | 3E | 04 | 32 | 08 | 10 | F6 | 08 | 21 |
| 0430 | BD | 05 | 03 | DF | 03 | 21 | 37 | 03 | 22 | 09 | 10 | 2A | 10 | 10 | 7E | B7 |
| 0440 | 3A | 08 | 10 | F2 | 49 | 04 | 3A | 07 | 10 | B6 | E6 | 3F | 32 | 07 | C0 | 23 |
| 0450 | 7E | 23 | 22 | 10 | 10 | B7 | FA | 6B | 04 | CA | 60 | 04 | 32 | 0A | F0 | C9 |
| 0460 | 7E | E6 | 40 | C8 | 21 | 35 | 04 | 22 | 09 | 10 | C9 | 3A | 07 | 10 | 32 | 08 |
| 0470 | 10 | C9 | 88 | 00 | C8 | 01 | 10 | 0D | 08 | 10 | 88 | 3C | 80 | FF | 00 | 08 |
| 0480 | 00 | 00 | 21 | 04 | 10 | 7E | 3D | 4F | C8 | 77 | 3A | 08 | 10 | 07 | FE | 08 |
| 0490 | C0 | 3E | 01 | C9 | 06 | 09 | EF | 06 | 03 | CD | 1E | 03 | 3E | EA | 21 | A4 |
| 04A0 | 04 | C3 | 59 | 03 | 06 | FC | CD | 28 | 03 | 3E | FE | 21 | B1 | 04 | C3 | 59 |
| 04B0 | 03 | 21 | 01 | 10 | 7E | E6 | 7F | 77 | E6 | 40 | CA | AB | 02 | 3E | 08 | C3 |
| 04C0 | 51 | 03 | CD | 71 | 02 | 21 | 01 | 10 | 7E | F6 | 81 | 77 | 3E | 16 | 32 | 12 |
| 04D0 | 10 | 3A | 08 | 10 | B7 | CA | 3D | 00 | 3A | 04 | 10 | FE | 02 | CA | BD | 04 |
| 04E0 | FE | 01 | CA | D2 | 05 | 4F | FE | 15 | D2 | F5 | 04 | 06 | 00 | 21 | E3 | 05 |
| 04F0 | 09 | 7E | 32 | 12 | 10 | 79 | D6 | 02 | FE | 05 | DA | FF | 04 | 3E | 05 | 32 |
| 0500 | 05 | 10 | 3E | 6A | 21 | 0A | 05 | C3 | 59 | 03 | 06 | 01 | CD | 1E | 03 | CD |
| 0510 | 8A | 04 | F6 | 18 | 32 | 07 | 10 | CD | 83 | 05 | 21 | 8F | 05 | 22 | 09 | 10 |
| 0520 | 21 | 9C | 05 | 22 | 02 | 10 | CD | 8A | 04 | F6 | 08 | 21 | 05 | 10 | 35 | FA |
| 0530 | 42 | 05 | 21 | 7F | 04 | 22 | 10 | 10 | 21 | 0A | F0 | 36 | 09 | CA | 42 | 05 |
| 0540 | F6 | 10 | 32 | 07 | 10 | 21 | 04 | 10 | 7E | 3D | 77 | FE | 01 | CA | 6D | 05 |
| 0550 | 4F | FE | 0C | 3A | 12 | 10 | D2 | 68 | 05 | 3A | 12 | 10 | 21 | DA | 05 | 06 |
| 0560 | 00 | 09 | 46 | B8 | D2 | 68 | 05 | 78 | 32 | 0B | F0 | C9 | AF | 32 | 00 | 10 |
| 0570 | 06 | FE | CD | 28 | 03 | 21 | 37 | 03 | 22 | 09 | 10 | 3E | 2C | 21 | BD | 05 |
| 0580 | C3 | 59 | 03 | 3A | 07 | 10 | 32 | 07 | C0 | E6 | 07 | 32 | 08 | 10 | C9 | 21 |
| 0590 | AA | 05 | 22 | 09 | 10 | 21 | 17 | 05 | 22 | 02 | 10 | C9 | 21 | 17 | 05 | 22 |
| 05A0 | 09 | 10 | 21 | 3D | 00 | 3E | 7D | C3 | 59 | 03 | 21 | B1 | 05 | 22 | 02 | 10 |
| 05B0 | C9 | CD | 83 | 05 | 21 | 17 | 05 | 22 | 02 | 10 | C3 | 26 | 05 | 21 | 01 | 10 |
| 05C0 | 7E | E6 | BF | 77 | 21 | CC | 05 | 3E | EA | C3 | 59 | 03 | 3A | 08 | 10 | 32 |
| 05D0 | 07 | C0 | 3A | 01 | 10 | B7 | FA | 94 | 04 | C3 | AB | 02 | 46 | 24 | 20 | 1D |
| 05E0 | 1B | 19 | 18 | 17 | 16 | 16 | 78 | 5B | 44 | 3B | 35 | 2D | 28 | 21 | 20 | 10 |
| 05F0 | 1A | 19 | 18 | 18 | 18 | 17 | 17 | 7A | 1F | 7B | D2 | 20 | 06 | 06 | 30 |
| 0600 | 0E | 0E | 23 | 89 | 06 | BE | CA | 12 | 06 | 04 | 23 | 0D | FA | 84 | 06 | C3 |
| 0610 | 05 | 06 | 78 | FE | 3A | FA | 85 | 06 | 01 | 05 | 00 | 09 | 7E | C3 | 85 | 06 |
| 0620 | 06 | 00 | 4F | 21 | 6A | 06 | 09 | FE | 31 | 7E | D2 | 85 | 06 | 79 | C6 | 2A |
| 0630 | FE | 41 | D2 | 3F | 06 | FE | 3C | DA | 3F | 06 | 21 | 8E | 06 | 09 | 7E | 21 |
| 0640 | 85 | 06 | 4F | 7A | E6 | 02 | CA | 5D | 06 | 79 | FE | 30 | CA | 84 | 06 | F2 |
| 0650 | 55 | 06 | D6 | 10 | E9 | FE | 41 | FA | 84 | 06 | D6 | 40 | E9 | 06 | 0E | EF |
| 0660 | 7A | E6 | 04 | 79 | CA | 85 | 06 | FE | 30 | CA | 84 | 06 | F2 | 72 | 06 | C6 |
| 0670 | 10 | E9 | FE | 3C | FA | 52 | 06 | FE | 4B | FA | 84 | 06 | FE | 50 | CA | 52 |
| 0680 | 06 | FA | 6F | 06 | AF | 32 | 0C | 10 | C9 | 35 | 23 | 02 | 04 | 20 | 21 | 22 |
| 0690 | 2B | 1F | 25 | 0D | 0E | 0F | 31 | 32 | 2B | 2D | 2E | 0A | 0D | 7F | 1B | 20 |
| 06A0 | 40 | 5B | 5C | 5D | 5E | 00 | 00 | 00 | 00 | 00 | 93 | 00 | 00 | 7B | 7B |
| 06B0 | 00 | 00 | 60 | 00 | 60 | 00 | 14 | 36 | 00 | 36 | 14 | 26 | 49 | 7F | 49 | 32 |
| 06C0 | 23 | 13 | 08 | 64 | 62 | 05 | 02 | 35 | 49 | 36 | 00 | 40 | 20 | 10 | 00 | 41 |
| 06D0 | 22 | 1C | 00 | 00 | 00 | 00 | 1C | 22 | 41 | 08 | 1C | 3E | 1C | 08 | 08 | 08 |
| 06E0 | 3E | 08 | 08 | 00 | 00 | 0E | 0D | 00 | 08 | 08 | 08 | 08 | 08 | 00 | 00 | 03 |
| 06F0 | 03 | 00 | 20 | 10 | 08 | 04 | 02 | 3E | 41 | 41 | 3E | 00 | 00 | 01 | 7F | 21 |
| 0700 | 00 | 31 | 49 | 49 | 49 | 27 | 36 | 49 | 49 | 41 | 22 | 04 | 7F | 24 | 14 | 0C |
| 0710 | 4E | 51 | 51 | 51 | 72 | 06 | 49 | 49 | 29 | 1E | 60 | 50 | 48 | 47 | 40 | 36 |
| 0720 | 49 | 49 | 49 | 36 | 3C | 4A | 49 | 49 | 30 | 00 | 00 | 36 | 36 | 00 | 00 | 00 |
| 0730 | 6E | 6D | 00 | 41 | 22 | 14 | 08 | 00 | 14 | 14 | 14 | 14 | 14 | 00 | 08 | 14 |
| 0740 | 22 | 41 | 20 | 50 | 4D | 40 | 20 | 3C | 42 | 4F | 49 | 26 | 3F | 48 | 48 | 48 |
| 0750 | 3F | 36 | 49 | 49 | 7F | 41 | 22 | 41 | 41 | 3E | 3E | 41 | 41 | 7F | 41 |
| 0760 | 41 | 49 | 49 | 49 | 7F | 40 | 48 | 48 | 48 | 7F | 4E | 49 | 49 | 41 | 3E | 7F |
| 0770 | 08 | 08 | 08 | 7F | 00 | 41 | 7F | 41 | 00 | 7E | 01 | 01 | 01 | 02 | 41 | 22 |
| 0780 | 14 | 08 | 7F | 01 | 01 | 01 | 01 | 7F | 7F | 20 | 18 | 20 | 7F | 7F | 08 | 10 |
| 0790 | 20 | 7F | 7F | 41 | 41 | 41 | 7F | 30 | 48 | 48 | 48 | 7F | 3D | 42 | 45 | 41 |
| 07A0 | 3E | 31 | 4A | 4C | 48 | 7F | 22 | 45 | 49 | 51 | 22 | 40 | 40 | 7F | 40 | 40 |
| 07B0 | 7E | 01 | 01 | 01 | 7E | 70 | 0C | 03 | 0C | 70 | 7E | 01 | 0E | 01 | 7E | 63 |
| 07C0 | 14 | 08 | 14 | 63 | 60 | 10 | 0F | 10 | 60 | 61 | 51 | 49 | 45 | 43 | 41 | 41 |
| 07D0 | 7F | 00 | 00 | 02 | 04 | 08 | 10 | 20 | 00 | 00 | 7F | 41 | 41 | 10 | 20 | 40 |
| 07E0 | 20 | 10 | 01 | 01 | 01 | 01 | 00 | 10 | 20 | 40 | 00 | 41 | 41 | 36 | 08 |
| 07F0 | 00 | 00 | 00 | 77 | 00 | 00 | 00 | 08 | 36 | 41 | 41 | 20 | 10 | 20 | 40 | 20 |

At each print/step operation, however, prior to loading the dot pattern into the printhead, the controller enters a wait state for a period of 11.3 milliseconds. This is to insure that, at the end of a carriage return, all carriage motion has ceased prior to the printing of the first character in a line. At the end of the 11.3 millisecond wait state, the controller couples the power supply voltage to the printhead, accesses the dot pattern for the character and loads the first column of the dot pattern into the printhead. This loading is accomplished by generating an address such as that illustrated in Table IV. One bit of bits 7-11 will be high indicating which of the five columns of the printhead is being strobed. In the case illustrated, the first column is strobed. One bits in positions 0-6 indicate which of the mesas in the first column are to be strobed. Bit positions 0-11 are coupled to the X and Y printhead drivers 16 and 18 of FIG. 1. Bits 12, 13, and 14 are monitored by the address decode circuit and as previously indicated in the discussion of FIG. 3, the particular bit pattern shown results in a one microsecond high level signal appearing on line 128. This high level signal gates the printhead driver input signal to the appropriate X and Y inputs of the printhead itself. As a result, in the example of Table IV, dot positions 1, 4 and 7 of Column 1 of the printhead are turned on. As long as the power supply voltage remains applied to the printhead, these dot positions are latched on even though the X and Y input signals are subsequently removed. A new address is then loaded onto the address bus with the same bit pattern in columns 12-15. In this case, however, only bit position 10 of positions 7-11 will be high and the pattern in positions 0-6 indicates which dots of column 2 of the printhead are to be turned on. This procedure continues until all five columns of the printhead have been loaded, this procedure taking approximately 200 microseconds for its completion. The strobed printhead requires only 12 address lines to the printhead in contrast with 35 lines required when a 5×7 matrix is directly addressed. This is highly advantageous since the 12 line cable to the printhead is more reliable than a 35 line cable.

TABLE IV

| 15 | 12 | 11 | | 7 | 6 | | | 0 |
|---|---|---|---|---|---|---|---|---|
| 0 0 | 1 0 1 | 1 0 0 0 0 | | 1 1 0 | 0 1 0 0 1 | | | |
| STROBE | | X | | | Y | | | |

The print operation then continues for a total period of 10 milliseconds at the end of which the power supply voltage is removed from the printhead. At this point, the printhead carriage is stepped to the next printing location. The logic signal diagram of FIG. 6 may be useful in understanding the print/step cycle. The logic signals shown are those appearing at the output of control register 24. For the first 11.3 milliseconds of the cycle, that is from $t_1$ to $t_2$, the controller is in a wait state. For the next 10 milliseconds, that is from $t_2$ to $t_3$, the controller is in the PRINT state as described above. At $t_3$, the PRINT signal is turned off, the enable signal to PHASE A is turned off, the enable signal to PHASE B is turned on, and both the FAST and the STEP logic signals are switched high. The high level FAST signal, which lasts for a one millisecond duration, has the effect of rapidly squelching the decaying current in the PHASE a motor winding so as to permit the stepper motor to move away from the PHASE A detent position. The high level STEP signal results in a rapid current buildup in the PHASE B motor winding to cause acceleration of the stepper motor toward the PHASE A detent position. This continues until time $t_4$, at which time the change of the SENSOR signal indicates that the stepper motor has traversed one third of the distance between the detent positions for PHASE A and PHASE B. After a 200 microsecond delay, the enable signal to PHASE B is switched off and the enable signal to PHASE A is switched on so as to cause a decelerating current to flow in lagging PHASE A of the motor. At the same time the STEP signal goes low to cause a gradual build up of the braking current in PHASE A and the FAST signal goes high to rapidly squelch the decaying current in PHASE B. After one additional millisecond, the FAST signal is switched low and the STEP signal is switched high to permit the braking current in PHASE A to build up to a high level. One millisecond later, that is, at $t_6$, PHASE A is switched off and the enable signal to PHASE B is switched on to generate a current in PHASE B for pulling the motor into the detent position. The STEP signal remains high for four additional milliseconds, that is, until $t_7$, to insure that the stepper motor pulls into the detent position for PHASE B. At time $t_7$, the STEP signal goes low to reduce the current flowing in the PHASE B motor coil to a holding value.

Each print/step operation is deemed to occupy a period of 28.5 milliseconds. In FIG. 6, this cycle begins at time $t_1$ and concludes at time $t_8$, at which time the 11.3 millisecond waiting period for the next print/step cycle begins. In a sense there is overlapped operation since the motor may still be pulling into the new detent position for the step cycle illustrated, even though the wait period for the next print/step cycle has already begun. This overlapped operation is made possible by the plurality of interval timers available in I/O chip 48. One of these interval timers is used to time the ten millisecond print period and the various periods associated with the turning on and off of the FAST, STEP, PHASE A, and PHASE B waveforms. A second of these interval timers is used to time the 11.3 millisecond wait period between $t_1$ and $t_2$, and to time the 7.2 millisecond period between time $t_3$ and time $t_8$. If, during this last mentioned 7.2 millisecond time period the SENSOR signal has gone high as illustrated in FIG. 6, then at the end of the 7.2 millisecond period, that is at time $t_8$, the print/step cycle is declared to be over and the next cycle can begin. If, however, during the 7.2 millisecond time period no SENSOR signal has occurred, the controller declares a paper out condition. In this case rather than a normal termination of the print/step cycle as illustrated in FIG. 6, the controller goes into a fail-safe return mode which will be described below.

Under normal conditions, the stepper motor will rotate sufficiently far to cause a SENSOR signal well before the expiration of the 7.2 millisecond time period. If the printer has run out of paper, however, the abnormally high friction between the printhead and the paper roller prevents the stepper motor from traversing ⅓ of the distance between adjacent detent positions within 7.2 milliseconds. Accordingly, the expiration of the 7.2 millisecond period prior to the occurrence of a SENSOR signal is a valid indication of a paper out condition. It will be seen, therefore, that the single optical sensor, in addition to providing closed loop control of the stepping action from one detent position to the next, is also used as a paper out detector.

The backspace operation is identical to the forward space sequence described above with the exception of the fact that the 10 millisecond print period is eliminated. Thus, the total period for each backspace step is 18.5 milliseconds.

In describing the carriage return operation, it will first be assumed that the printhead carriage is located outside column 20 at the onset of the carriage return. Understanding of the carriage return operation may be facilitated by a consideration of the flow diagram of FIG. 7. At the beginning of the carriage return, the flow is at state 300. At all times during the carriage return operation the STEP signal is high so as to induce rapid build up of current in each new leading phase as the stepper motor slews in the carriage return direction. In the preferred embodiment, it is desired that the motor slew at constant velocity with the travel time between adjacent detent positions having an average value of 1.5 milliseconds. Accordingly, at the beginning of the carriage return in state 300, one of the interval timers of I/O chip 48 is set to 1.5 milliseconds. At this same time, current is disabled in the detent motor phase occupied by the stepper motor at the time carriage return begins and the next motor phase in the carriage return direction is enabled. During the first several phase changes, the stepper motor is accelerating and the 1.5 millisecond timer expires before a SENSOR signal occurs, indicating that the motor has traversed ⅓ of the angular distance to the next detent position. Expiration of the timer causes the flow to follow path 301 to a wait state 302. The controller remains in wait state 302 until the SENSOR signal does occur at which time flow follows path 303 back to state 300. At this point in time, the timer is reset to a new 1.5 millisecond period, and the motor phases are again switched to enable the next new motor phase in the carriage return direction. Flow continues in this fashion around the loop 300, 301, 302 and 303 until the motor reaches or slightly exceeds the desired constant velocity. If the motor velocity should go slightly high, while the flow is in state 300, then a SENSOR signal will occur prior to the expiration of the 1.5 millisecond timer. Under these circumstances, flow will pass from stage 300 along path 304 to wait state 305. Here the flow awaits the expiration of the 1.5 millisecond timer, at which point flow returns along path 306 to state 300. Thus, when the motor is slewing at a velocity lower than that corresponding to a travel time of 1.5 milliseconds between detent position, the change of motor phases awaits the occurrence of the SENSOR so as to prevent the electronics from getting ahead of the actual motor position. When the motor velocity, however, is higher than that corresponding to the 1.5 millisecond travel time, the motor phase changes await the occurrence of the timer so as to prevent the motor position from getting ahead of the electronics. In this way the stepper motor is controlled to slew at the desired constant velocity. At the beginning of each of the first five cycles of the above described sequence, the FAST pulse is switched high for a 1 millisecond period so as to rapidly squelch the decaying current in the lagging motor phase and assist in accelerating the stepper motor to the desired slew velocity.

If at any time during the above described sequence a total period of 8.0 milliseconds expires after the timer is set at stage 300, and before a SENSOR signal is received, then flow travels along path 301 to state 302 and along path 307 to a fail-safe return state 308. As before, this is deemed to be indicative of a paper out condition.

In the normal course of events, however, flow continues centered around state 300 until the printhead carriage reaches column 12. At this point, a controlled deceleration is initiated to bring the printhead to a stop as it reaches column 1. At the beginning of the move to column 10, instead of setting the timer to 1.5 milliseconds, a longer time is used. For each column throughout the deceleration period, a successfully longer time is used when setting the timer. This causes the motor phases to change on the timer, causing deceleration. The specific times used in the preferred embodiment of the invention are given in Table V. The values in the deceleration table are selected to decelerate the motor along the profile that resembles the natural deceleration of the system.

During the deceleration phase, particularly in low friction systems, it may sometimes happen that the printhead carriage does not decelerate as rapidly as desired and, as a result, two consecutive SENSOR signals may be received before the timer expires. By way of example, assume that the motor is passing through the phase C detent position and that at step 300 the timer is set and PHASE B is enabled. The first SENSOR signal indicating that the motor has rotated a portion of the way between PHASE C and PHASE B causes flow to move along path 304 to wait state 305. Before expiration of the timer, another SENSOR signal is received indicating that the motor has rotated to a point midway between PHASE B and PHASE A. This SENSOR signal causes flow to move along path 309 to wait state 310. Now, when the timer expires the flow moves along path 311 to state 312. At this point, the timer is reset and the motor phases are changed so as to energize PHASE A and de-energize PHASE B. It will be recalled, however, that the motor is already midway between PHASE B and PHASE A. The next SENSOR signal causing flow along path 313 indicates that the motor has progressed to a point part way between PHASE A and PHASE C. At this point, the motor current flowing in phase A causes a braking torque. Thus, as long as the flow stays in the loop 310, 311, 312, and 313, there will be a braking torque generated during a portion of each step. Ultimately, this braking torque will slow the motor down sufficiently so that two timer expirations will occur without the intervention of a SENSOR signal. When this occurs, flow will move from state 310 through path 311 to state 312 and through path 313 back to state 300. When this occurs, the motor phase excitation will be back in synchronization with the actual location of the stepper motor and normal deceleration continues.

TABLE V

| COLUMN | TIMER SETTING (MSEC) |
|---|---|
| 11 | 1.61 |
| 10 | 1.61 |
| 9 | 1.67 |
| 8 | 1.74 |
| 7 | 1.80 |
| 6 | 1.93 |
| 5 | 2.06 |
| 4 | 2.25 |
| 3 | 2.50 |
| 2 | 4.68 |

In the above mentioned mode of operation, the timer was set to a 1.5 millisecond period for each step during the acceleration phase of the carriage return. When, however, the printhead carriage is inside column 21 when the carriage return begins, a different rate of acceleration is used. A slower acceleration allows the processor to intercept the deceleration profile and bring the head to a smooth stop at column 1. The times used in the preferred embodiment are shown in Table VI. The time is read from the acceleration table once at the beginning of the carriage return and that time is used for each step until a column is reached inside column 12 whose deceleration time is longer. This represents the point where the deceleration profile is intercepted and deceleration begins.

TABLE VI

| COLUMN | TIMER SETTING (MSEC.) |
|---|---|
| 20 | 1.67 |
| 19 | 1.67 |
| 18 | 1.67 |
| 17 | 1.74 |
| 16 | 1.74 |
| 15 | 1.74 |
| 14 | 1.80 |
| 13 | 1.86 |
| 12 | 1.99 |
| 11 | 2.25 |
| 10 | 2.31 |
| 9 | 2.76 |
| 8 | 3.08 |
| 7 | 3.59 |
| 6 | 3.98 |
| 5 | 4.55 |
| 4 | 6.02 |
| 3 | 7.88 |

When power is first applied to the system, it is necessary for the controller to determine the precise location of the carriage. When the carriage is in column 1, the stepper motor is detented at the PHASE A detent position. It is possible for the carriage to move one more position to the left, in which case the stepper motor will be in the PHASE C detent position. This location will be referred to as column 0. Further movement to the left from column 0 is inhibited by a mechanical limit. When power is first applied to the system, the carriage may be anywhere within its permissible range of travel. Initially, the phases are energized in the sequence C, B, A, C, with this sequence of four phase energizations occurring independent of whether or not any SENSOR pulses are received. If the carriage is initially at a point remote from the left hand mechanical limit, this results in the stepper motor moving first to the PHASE C detent position, then to PHASE B, then PHASE A, and finally PHASE C. If, on the other hand, the carriage was initially located in column 0, then the first phase change from PHASE C to to PHASE B will result in no movement since the attempted movement is inhibited by the left hand mechanical limit. When PHASE A is energized, however, the carriage will move to column 1 with the motor occupying the PHASE A detent position. When PHASE C is energized, the motor moves to the left to column 0. Similarly, if the carriage is in any of columns 1, 2 or 3 when power is applied, the initial sequence will conclude with the carriage being in column 0 position.

After the initial forced energization of four phases, the controller is repeatedly operated in the back space mode as described above. This continues until a back space is attempted and no SENSOR signal is received. Such lack of SENSOR signal will occur when the carriage has reached column 0 and the attempt to move the stepper motor to PHASE B is inhibited by the left hand limit. The controller recognizes this left hand limit by the absence of the SENSOR signal. At this point, the controller moves the carriage one space to the right to column 1.

After reaching column 1, a brief sequence is performed for the purpose of recognizing a paper out condition. Two more steps to the right are performed, that is to PHASE B and PHASE C. This is followed by two steps to the left, that is to PHASE B and to PHASE A so as to return the carriage to column 1. If, during any of the last mentioned four steps, a period of greater than 7.2 milliseconds expires before a sensor signal is detected, the controller interprets this as a paper out condition. If the paper out condition does not occur, the carriage is in column 1 and ready to begin print operations.

During step operations after power-up, a sensor failure will activate the paper out condition. The friction between the printhead and the roller is too great without paper to perform a normal step. When paper out is activated, the controller will only process carriage return, line feed, and bell characters. The keyboard scanner checks for a paper out condition when the paper advance key is detected. Instead of generating a series of carriage return characters, the keyboard scanner will generate a series of linefeed characters during a paper out condition when the paper advance key is depressed. This will cause the carriage return at the beginning to be bypassed. Entering a carriage return during a paper out condition will force a fail safe return to the left.

When the terminal runs out of paper, the printhead will stop wherever it first encounters the roller. The operator will then load paper using the line feed and paper advance keys. Entering a carriage return after paper is loaded will cause the printhead to seek the left-hand margin.

Whereas there has been disclosed the preferred embodiment of the invention, there may be suggested to those skilled in the art certain minor modifications which do not depart from the spirit and scope of the invention as set forth in the appended claims.

What is claimed is:

1. A printer mechanism comprising in combination:
   (a) a stepper motor coupled to translate a printhead relative to a printing medium,
   (b) a sensor for providing a signal representative of the position of said stepper motor, and
   (c) means responsive to said sensor to control the rotation of said stepper motor, said means being further responsive to said sensor to detect a paper out condition.

2. The printer mechanism of claim 1 wherein said means is further responsive to said sensor to locate a margin of said printing medium.

3. The printer mechanism of claim 1 wherein said printhead is a thermal printhead.

4. The printer mechanism of claim 1 wherein said sensor comprises a slotted disk adapted to rotate with said stepper motor and means for detecting the passage of the slots of said disk.

5. A printer mechanism comprising:
   (a) a multi-phase stepper motor for controlling the location of a printhead,
   (b) a sensor for providing pulses indicative of rotation of said stepper motor between adjacent phases,
   (c) means responsive to the application of power to said mechanism to energize a predetermined phase of said stepper motor, (d) second means to suquentially enable adjacent phases of said stepper motor to cause said printhead to move toward a margin of said printer mechanism, and (e) third means responsive to the absence of a pulse from said sensor after a new phase has been enabled to locate said margin.

6. A printer mechanism comprising:

(a) a multi-phase stepper motor for controlling the location of a printhead, (b) a sensor for providing pulses indicative of rotation of said stepper motor between adjacent phases, (c) means for declaring a paper out condition when a predetermined time expires after energization of a new stepper motor phase without the reception of a pulse from said sensor.

7. A printer mechansim comprising:

(a) a stepper motor coupled to translate a printhead relative to a printing medium, and (b) control means for operating said printer mechanism in a print/step sequence, said control means further comprising:

(i) means for enabling a first phase of said motor while disabling a second phase, (ii) means responsive to a logic signal to suppress the decaying current in said second phase, said responsive means including a network connected to maintain a constant voltage across said second phase, (iii) a sensor for providing a second signal when said stepper motor has rotated through a predetermined portion of the angle between said second and first phases, and (iv) second means responsive to said second signal to enable said second phase while disabling and suppressing the decaying current in said first phase, said second responsive means including a network connected to maintain a constant voltage across said first phase.

8. A printer mechanism comprising:

(a) a stepper motor coupled to translate a printhead relative to a printing medium, and (b) control means for operating said printer mechanism in a print/step sequence, said control means further comprising:

(i) means for enabling a first phase of said motor while disabling a second phase, (ii) means responsive to a logic signal to supress the decaying current in said second phase, said responsive means including a network connected to maintain a constant voltage across said second phase, and (iii) means for enabling said first phase a predetermined time after the occurrence of said logic signal.

9. A thermal printer mechanism comprising:

(a) a multiphase stepper motor coupled to control the position of a thermal printhead relative to a printing medium, and (b) control means for causing said motor to operate said printhead in a carriage return mode, said control means further comprising:

(i) means to accelerate said motor to a desired velocity, (ii) means to substantially maintain said desired velocity during a portion of said carriage return, (iii) means to decelerate said motor, (iv) a sensor adapted to provide at least one logic pulse when said stepper motor moves from one detent position to an adjacent detent position, and 10. The printer mechanism of claim 9 wherein said timer is initiated to a constant period for all printhead locations greater than a preselected column and to an increasing period for all printhead positions less than said preselected column.

11. The printer mechanism of claim 10 wherin said constant period has a first value when the carriage return begins beyond a preselected printhead location and a second selectable value when the carriage return begins at or below said preselected printhead location.

12. A thermal printer mechanism comprising:

(a) a multiphase stepper motor coupled to control the position of a thermal printhead relative to a printing medium, (b) control means for causing said motor to operate said printhead in a carriage return mode, said control means further comprising:

(i) means to accelerate said motor to a desired velocity, (ii) means to substantially maintain said desired velocity during a portion of said carriage return, and (iii) means to decelerate said motor, and (c) a sensor adapted to provide at least one logic pulse when said stepper motor moves fom one detent position to an adjacent detent position, wherein said carriage return is effected by sequentially enabling adjacent phases of said stepper motor, and wherein a timer is initiated at the time of each phase change, the phase changes taking place upon said at least one logic pulse or upon the expiriation of said timer, whichever occurs last.

13. The printer mechanism of claim 12 wherein said timer is initiated to a constant period for all printhead locations greater than a preselected column and to an increasing period for all printhead positions less than said preselected column.

14. The printer mechanism of claim 13 wherein said constant period has a first value when the carriage return begins beyond a preselected printhead location and a second selectable value when the carriage return begins at or below said preselected printhead location.

* * * * *